(12) United States Patent
Chang et al.

(10) Patent No.: US 8,164,587 B2
(45) Date of Patent: Apr. 24, 2012

(54) LCD POWER SUPPLY

(75) Inventors: Shu-Ming Chang, Tainan County (TW);
Shwang-Shi Bai, Tainan County (TW);
Shen-Yao Liang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1076 days.

(21) Appl. No.: 11/755,450

(22) Filed: May 30, 2007

(65) Prior Publication Data
US 2008/0297499 A1  Dec. 4, 2008

(51) Int. Cl.
*G09G 5/00* (2006.01)

(52) U.S. Cl. .......................... 345/211; 345/204; 345/212

(58) Field of Classification Search .................. 345/211, 345/212, 48, 77–89, 102, 204, 690; 363/17, 363/25, 98, 21.08, 21.09, 21.12, 71; 315/225, 315/276, 291, 307, 282, 312, 219
See application file for complete search history.

(56) References Cited

U.S. PATENT DOCUMENTS

| | | | | |
|---|---|---|---|---|
| 4,347,558 A | * | 8/1982 | Kalinsky | 363/17 |
| 5,414,609 A | * | 5/1995 | Levran et al. | 363/17 |
| 6,091,209 A | * | 7/2000 | Hilgers | 315/291 |
| 6,320,766 B1 | * | 11/2001 | Park | 363/21.09 |
| 6,703,796 B2 | * | 3/2004 | Che-Chen et al. | 315/291 |
| 6,947,024 B2 | | 9/2005 | Lee et al. | |
| 6,995,989 B1 | * | 2/2006 | Wang | 363/21.08 |
| 7,291,987 B2 | * | 11/2007 | Chang et al. | 315/282 |
| 7,417,382 B2 | * | 8/2008 | Lin | 315/225 |
| 7,515,445 B2 | * | 4/2009 | Lin | 363/98 |
| 7,515,446 B2 | * | 4/2009 | Lin | 363/98 |
| 7,564,193 B2 | * | 7/2009 | Lyle et al. | 315/276 |
| 7,599,202 B2 | | 10/2009 | Fukumoto | |
| 7,839,100 B2 | * | 11/2010 | Liang et al. | 315/307 |
| 8,009,449 B2 | * | 8/2011 | Yuan et al. | 363/71 |
| 2003/0090913 A1 | * | 5/2003 | Che-Chen et al. | 363/21.12 |
| 2006/0170378 A1 | * | 8/2006 | Lyle et al. | 315/312 |
| 2006/0284568 A1 | * | 12/2006 | Chang et al. | 315/282 |
| 2009/0167199 A1 | * | 7/2009 | Liang et al. | 315/219 |

FOREIGN PATENT DOCUMENTS

| | | |
|---|---|---|
| CN | 1436030 A | 8/2003 |
| CN | 1543288 A | 11/2004 |
| CN | 1906841 A | 1/2007 |
| JP | 1543288 A | 11/2004 |

* cited by examiner

*Primary Examiner* — Prabodh M Dharia

(57) ABSTRACT

An LCD (liquid crystal display) power supply includes an AC to DC converter circuit, a transformer, a DC to AC converter, and a feedback circuit. The AC to DC converter circuit couples an AC power supply to generate a DC signal. The DC to AC converter couples the DC signal to a primary side of the transformer and alternates polarities thereof so that an AC signal is generated on a secondary side of the transformer to supply for a load. The feedback circuit receives a first feedback signal indicative of power being supplied to the load and modulates the DC signal generated by the AC to DC converter circuit according to the first feedback signal.

32 Claims, 8 Drawing Sheets

LCD POWER SUPPLY

BACKGROUND

1. Field of Invention

The present invention is directed to an LCD (liquid crystal display) power supply. More particularly, the present invention provides an LCD power supply for driving a CCFL (Cold Cathode Fluorescent Lamp).

2. Description of Related Art

FIG. 1 depicts a conventional LCD power supply system for driving a CCFL 150. The system includes an AC to DC circuit 120, a DC to AC circuit 130, and a transformer 140. The AC to DC circuit 120 is coupled to the AC input source 110 to provide a DC voltage. The DC to AC circuit 130 couples the DC voltage to a primary side of the transformer 140 and alternative polarities thereof. A CCFL 150 is coupled to a secondary side of the transformer 140. Hence, the secondary side of the transformer 140 generates an AC signal to supply to the CCFL 150.

Moreover, the conventional LCD power supply system further includes a feedback circuit 160 configured between the CCFL 150 and the DC to AC circuit 130. The feedback circuit 160 receives a feedback signal from the CCFL 150 to generate a modulation signal. The modulation signal is transmitted to the DC to AC circuit 130 and modulates a time parameter indicative of the DC voltage coupling time with the primary side of the transformer 140. Hence, the DC to AC circuit 130 couples the DC voltage to the primary side of the transformer 140 with a variable duty cycle according to the modulation signal. Therefore, the transformer 140 is based on the modulation signal to deliver power to the CCFL 150 load.

However, a new power supply system for driving CCFL is still needed as an alternative option for the wide application of the LCD.

SUMMARY

According to one embodiment of the present invention, an LCD power supply has an AC to DC converter circuit, a transformer, a DC to AC converter circuit, and a feedback circuit. The AC to DC converter couples to an AC power source to generate a DC signal. The DC to AC converter circuit couples the DC signal to a primary side of the transformer and alternates polarities thereof so that an AC signal is generated on a secondary side of the transformer to supply a load. The feedback circuit receives a first feedback signal indicative of power being supplied to the load and modulates the DC signal generated by the AC to DC converter circuit according to the first feedback signal.

According to another embodiment of the present invention, an LCD power supply includes an AC to DC converter circuit, a full bridge circuit, a transformer, and a feedback circuit. The AC to DC converter circuit couples the AC power source to generate a DC signal. The full bridge circuit has a first pair of switches arranged at opposite corners of the full bridge circuit, and a second pair of switches arranged at other opposite corners of the full bridge circuit. The first and second pair of switches are selectively coupled to the AC to DC converter circuit such that the first pair of switches defines a first conduction path and the second pair of switches defines a second conduction path. The transformer has a primary side and a secondary side. The primary side is selectively coupled to the AC to DC converter circuit in an alternating fashion with a fixed duty cycle through the first and second conduction paths such that an AC signal is generated on the secondary side to supply a load. The feedback circuit receives a first feedback signal indicative of power being supplied to the load and modulates the DC signal generated by the AC to DC converter circuit according to the first feedback signal.

According to one embodiment of the present invention, an LCD power supply has an AC to DC converter circuit, a transformer, and a DC to AC converter circuit. The AC to DC converter circuit couples an AC power source to generate a DC signal. The DC to AC converter circuit couples the DC signal to a primary side of the transformer and alternates polarities thereof so that an AC signal is generated on a secondary side of the transformer to supply a load. Wherein the DC signal is generated in response to amount of power delivered to the load.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
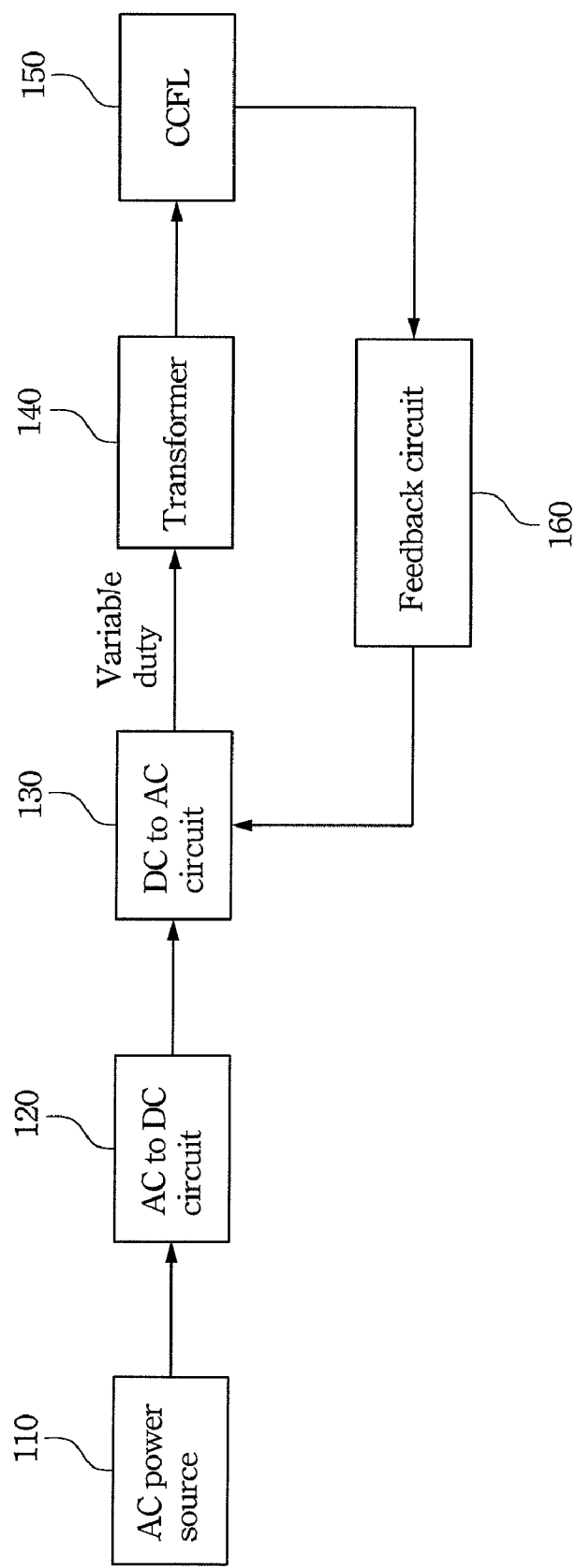
FIG. 1 depicts the system blocks of a conventional CCFL power supply system.

Reference is now be made in detail to the present embodiments of the invention, examples of which are illustrated in the accompanying drawings. Wherever possible, the same reference numbers are used in the drawings and the description to refer to the same or like parts.

Figure 2:
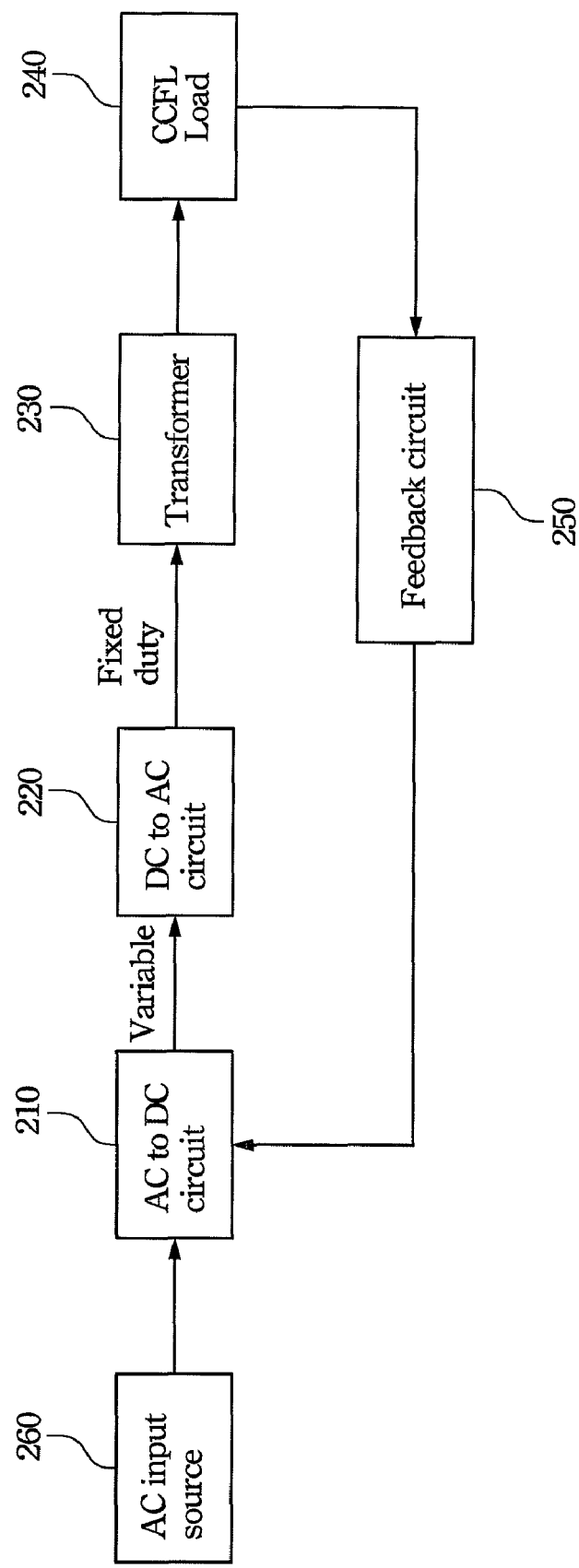
FIG. 2 depicts the system blocks of an LCD power supply system for driving a CCFL according to an embodiment of the present invention.

FIG. 2 depicts the system blocks of the LCD power supply system. The system includes an AC to DC circuit 210, a DC to AC circuit 220, and a transformer 230. The AC to DC circuit 210 couples to the AC input source 260 to provide a DC signal. The DC to AC circuit 220 couples the DC signal to the transformer 230 and alternative polarities thereof. Therefore, the transformer 230 generates an AC signal to supply the load. The load is a CCFL 240 with an LCD application.

The LCD power supply system further includes a feedback circuit 250 receives a feedback signal indicative of power being supplied to the CCFL 240 to modulate the DC signal. Therefore, the transformer 230 is based on the modulated DC signal to deliver power to the CCFL 240. The DC to AC circuit 220 couples the DC voltage to the transformer 230 with a fixed duty cycle.

The following provides a detailed description of the embodiments of the LCD power supply system. Someone skilled in the art could change the devices to satisfy other application or other design parameters.

First Embodiment

Figure 3:
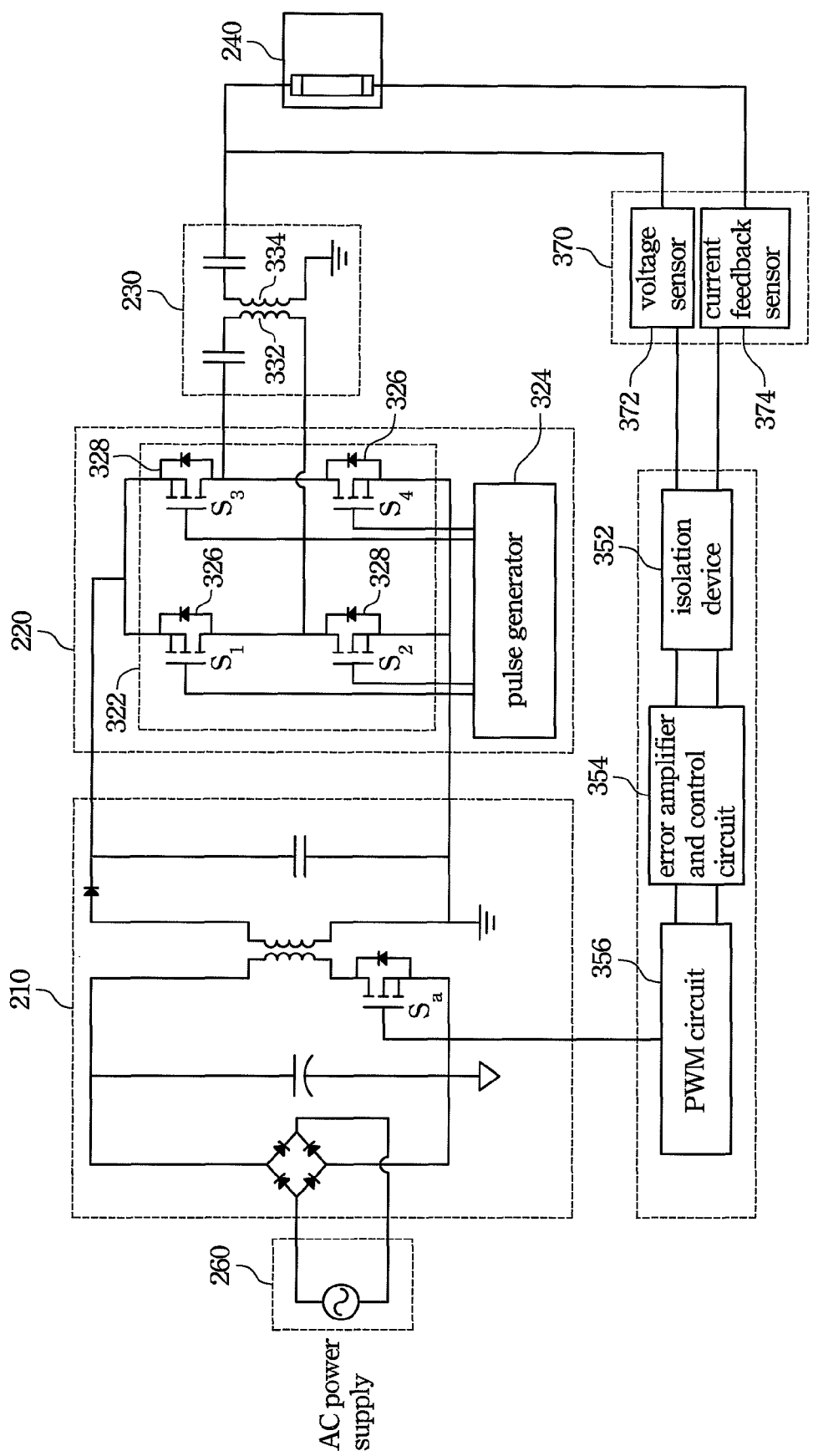
FIG. 3 depicts an LCD power supply circuit of the first embodiment of the present invention.

FIG. 3 depicts the LCD power supply of the first embodiment of the present invention for driving a CCFL 240. The LCD power supply has an AC to DC circuit 210, a DC to AC circuit 220, a transformer 230, and a feedback circuit 250.

The AC to DC circuit 210 couples the AC power source 260 to generate a DC signal. The AC to DC circuit 210 is a flyback converter in this embodiment. The flyback converter includes a MOSFET Sa to control the output voltage of the DC signal. The operation of the flyback converter and the specifics thereof have been know in the art and will not be described herein.

The DC to AC converter circuit 220 has a full bridge circuit 322. The full bridge circuit 322 includes four switches S1, S2, S3, and S4. Two switches S1 and S4 that form a first pair are arranged at opposite corners of the full bridge circuit 322. Two switches S2 and S3 that form a second pair are arranged on the other opposite corners of the full bridge circuit 322. The first and second pair of switches S1, S2, S3, and S4 are selectively coupled to the AC to DC converter circuit 210. Therefore, the first pair of switches S1, S4 defines a first conduction path and the second pair of switches S2, S3 defines a second conduction path.

The DC to AC circuit 220 further includes a pulse generator 324. The pulse generator 324 generates pulse signals to control the switches S1, S2, S3, and S4 of the first and second pairs, respectively. Moreover, the pulse signals have fixed duty cycles thus the first and second pair of switches switch in constant frequency.

The transformer 230 has a primary side 332 and a secondary side 334. The DC to AC converter circuit 220 couples the DC signal to the primary side 332 and alternatives polarities thereof. Therefore, the primary side 332 is selectively coupled to the AC to DC converter circuit 210 in an alternating fashion with a fixed duty cycle through the first and second conduction paths. Consequently, an AC signal is generated on the secondary side 334 to supply the CCFL 240 load.

The LCD power supply system further includes a feedback sensor 370 having a voltage sensor 372 and a current feedback sensor 374. The voltage sensor 372 and the current feedback sensor 374 obtain a voltage and current feedback signal from the CCFL 240, and generate a first feedback signal indicative of the power being supplied to the CCFL 240 for the feedback circuit 250.

The feedback circuit 250 includes a isolation device 352, an error amplifier and control circuit 354, and a PWM (Pulse Width Modulation) circuit 356. The isolation device 352 receives the first feedback signal and generates an isolation feedback signal for the signal transmission between circuits of different potentials and impedances. The isolation device 352 can be a 1 to 1 voltage transformer in this embodiment.

The error amplifier and control circuit 354 compares the isolation feedback signal with a predetermined reference signal and generates an error signal indicative of the difference, such as the voltage between the isolation feedback signal and the predetermined reference signal. The predetermined reference signal is a signal based on an external adjustment such as the standard situation adjustment of the CCFL 240 or the bright level adjustment of the CCFL 240.

The PWM circuit 356 controls the AC to DC converter circuit 210 to modulate the DC signal in response to the error signal. The PWM circuit 356 generates a PWM signal to the MOSFET Sa of the flyback circuit according to the error signal. Hence, the output voltage of the DC signal is modulated by the feedback circuit 250.

Second Embodiment

Figure 4:
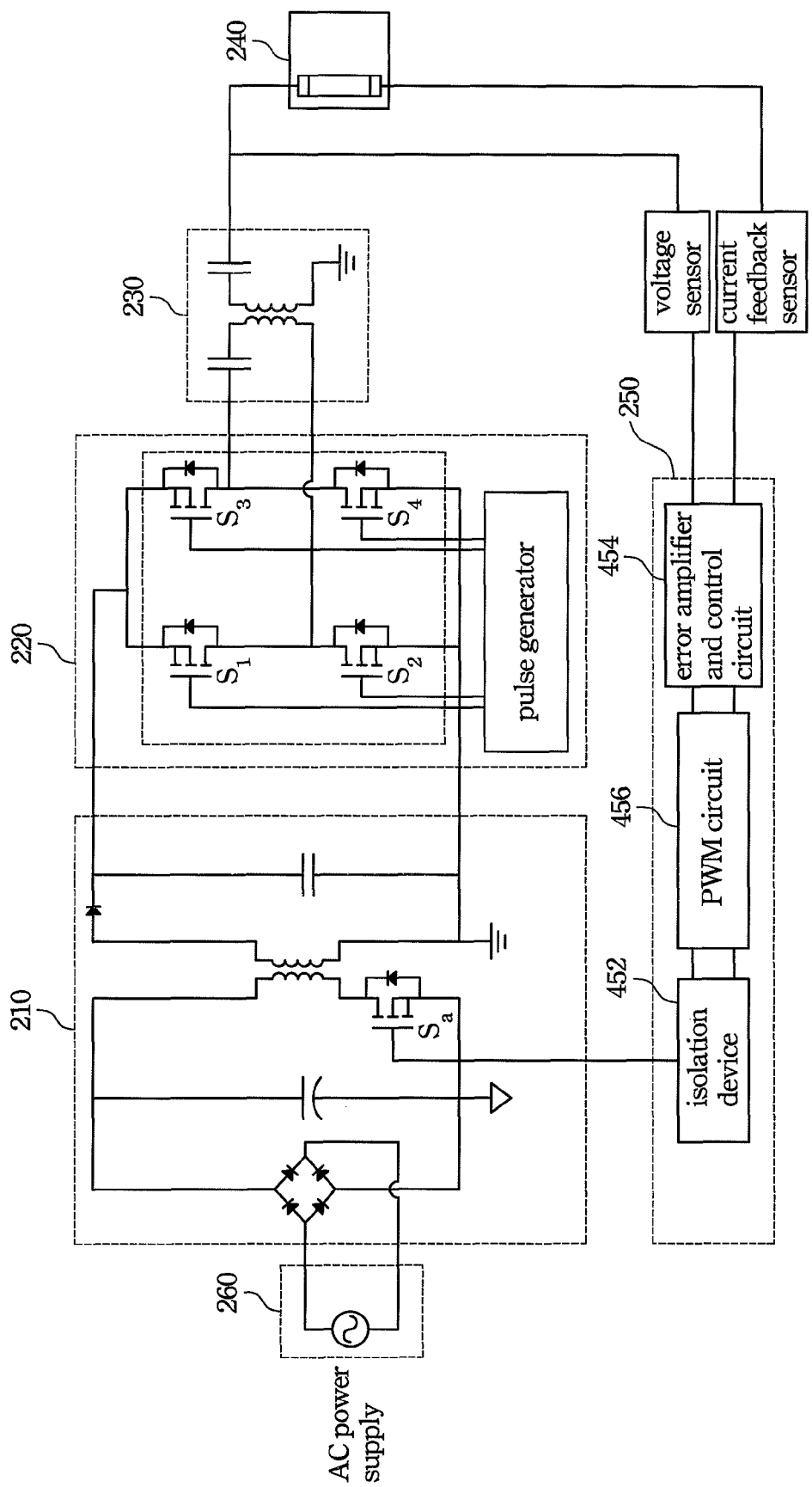
FIG. 4 depicts an LCD power supply circuit of the second embodiment of the present invention.

FIG. 4 depicts the LCD power supply of the second embodiment of the present invention for driving a CCFL 240. Also, the LCD power supply has an AC to DC circuit 210, a DC to AC circuit 220, a transformer 230, and a feedback circuit 250. However, most devices in the second embodiment are the same as the first embodiment and are thus not further described herein.

The feedback circuit 250 has an error amplifier and control circuit 454, a PWM circuit 456, and a isolation device 452. The error amplifier and control circuit 454 compares the first feedback signal with a predetermined reference signal and generates an error signal indicative of the difference, such as the voltage between the first feedback signal and the predetermined reference signal. The predetermined reference signal is a signal based on an external adjustment such as the standard situation adjustment of the CCFL 240 or the bright level adjustment of the CCFL 240.

The PWM circuit 456 generates a driving signal to modulate the DC signal in response to the error signal. Also, the driving signal is a PWM signal transmitted to the MOSFET Sa of the flyback circuit to modulate the output voltage of the DC signal according to the error signal.

However, the potentials and the impedances are different to the AC to DC converter circuit 210 and the transformer 230, the isolation device 452 isolates the driving signal from the feedback circuit 250 and transmits the isolated driving signal to the AC to DC converter circuit 210. The isolation device can be a photo-coupler in this embodiment.

Third Embodiment

The voltage level of the DC signal will drop down when the CCFL can not feedback the current feedback signal in some predictable or unpredictable situations.

For example, the CCFL dimming method uses the burst mode dimming in the common backlight system. However, when the dimming function begins, the CCFL flash is controlled by a low frequency PWM signal. The CCFL can not feedback the current feedback signal for the current feedback sensor and the voltage level of the DC signal may drop down when the CCFL is in off-state.

Hence, in order to prevent the voltage drop of the DC signal, the feedback circuit further receives other feedback signal and some switches are arranged to control whether or not the feedback signals to be transmitted to the feedback circuit is in this embodiment.

Figure 5:
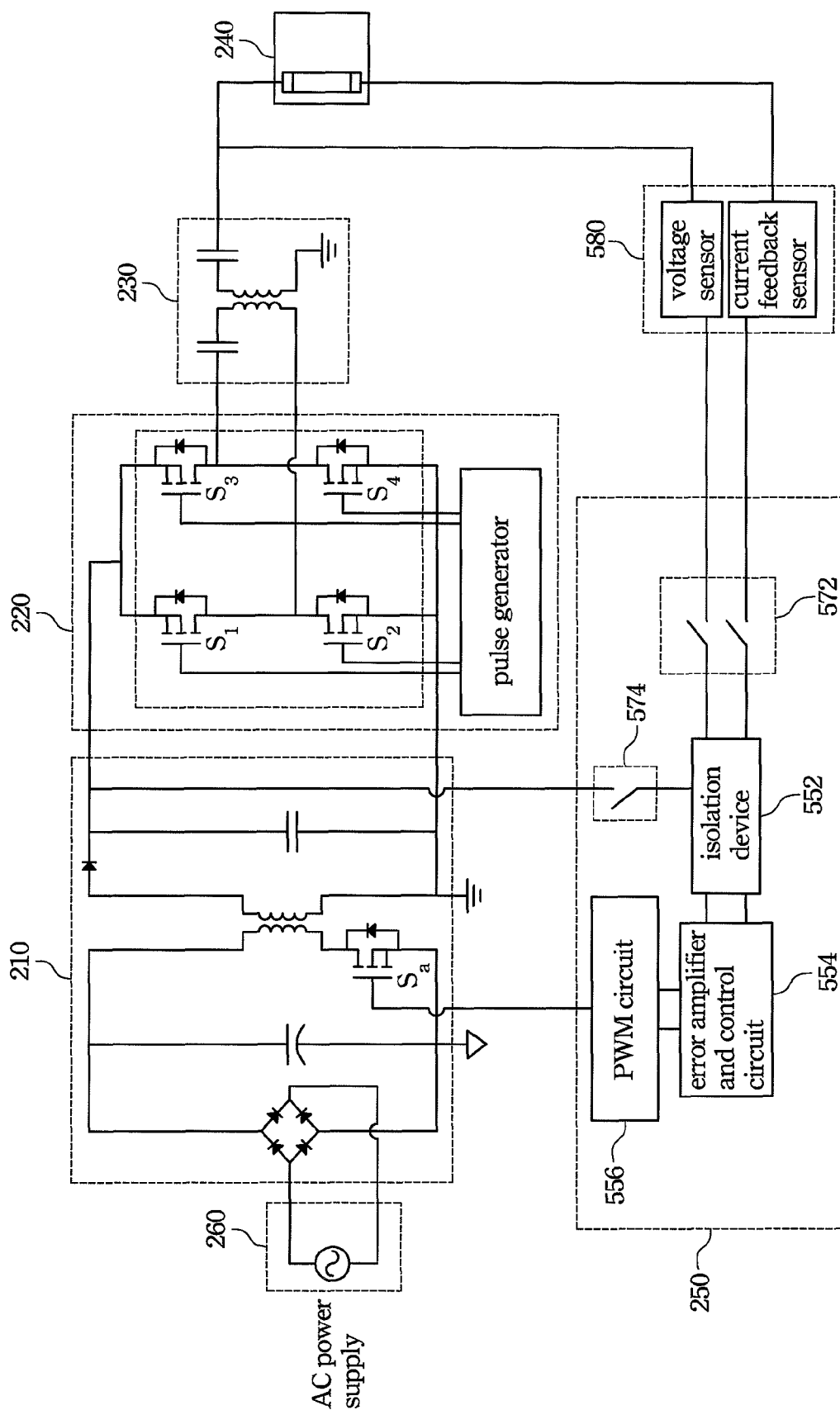
FIG. 5 depicts an LCD power supply circuit of the third embodiment of the present invention.

FIG. 5 depicts the LCD power supply of the third embodiment of the present invention to drive a CCFL 240. The LCD power supply has an AC to DC circuit 210, a DC to AC circuit 220, a transformer 230, and a feedback circuit 250. The LCD power supply further includes a first switch 572, and a second switch 574.

The feedback circuit 250 further receives a second feedback signal indicative of the voltage level of the DC signal for the modulation of the DC signal. Hence, the first switch 572 is used to determine whether or not the first feedback signal to be transmitted to the feedback circuit 250, and the second switch 574 is used to determine whether or not the second feedback signal to be transmitted to the feedback circuit 250. Moreover, the first switch 572 and the second switch 574 are alternately switched. Therefore, the first switch 572 is switched on when the CCFL 240 feedbacks the current feedback signal, the second switch 574 is switched on when the CCFL 240 can not feedback the current feedback signal.

The feedback circuit 250 includes a isolation device 552, an error amplifier and control circuit 554, and a PWM circuit 556. The isolation device 552 receives the first or second feedback signal and generates an isolation feedback signal for the signal transmission between circuits of different potentials and impedances. The isolation device 552 can be a 1 to 1 voltage transformer in this embodiment.

The error amplifier and control circuit 554 compares the isolation feedback signal to a predetermined reference signal and generates an error signal indicative of the difference, such as the voltage between the feedback signal and the predetermined reference signal. The PWM circuit 556 controls the AC to DC converter circuit to modulate the DC signal in response to the error signal.

Therefore, the output voltage of the DC signal is modulated by the feedback circuit 250. When the CCFL 240 feedbacks the current feedback signal, the first switch 572 connects to the feedback sensor 580 and the feedback circuit 250. The feedback circuit 250 receives the first feedback signal indicative of power being supplied to the load and modulates the DC signal according to the first feedback signal. When the CCFL 240 can not feedback the current feedback signal, the second switch 574 connects with the AC to DC converter circuit 210 and the feedback circuit 250. The feedback circuit 250 receives the second feedback signal indicative of the voltage level of the DC signal for the modulation of the DC signal.

Fourth Embodiment

Figure 6:
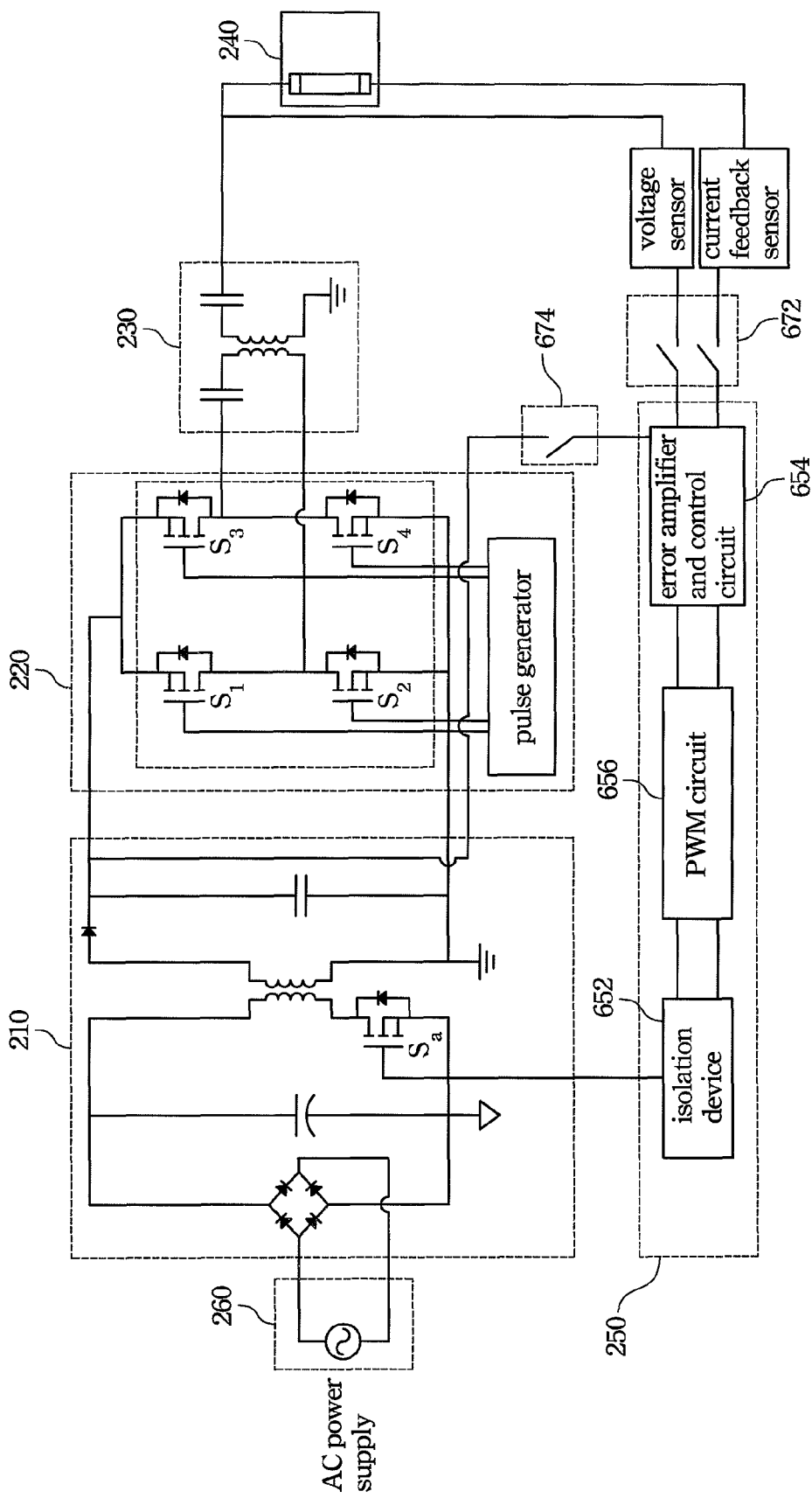
FIG. 6 depicts an LCD power supply circuit of the fourth embodiment of the present invention.

FIG. 6 depicts the LCD power supply of the fourth embodiment of the present invention for driving a CCFL 240. The LCD power supply further includes a first switch 672, and a second switch 674.

Accordingly, the first switch 672 is used to determine whether or not the first feedback signal to be transmitted to the feedback circuit 250, and the second switch 674 is used to determine whether or not the second feedback signal to be transmitted to the feedback circuit 250. The first switch 672 and the second switch 674 are alternately switched. Therefore, the first switch 672 is switched on when the CCFL 240 feedbacks the current feedback signal, the second switch 674 is switched on when the CCFL 240 can not feedback the current feedback signal.

The feedback circuit 250 includes an error amplifier and control circuit 654, a PWM circuit 656, and a isolation device 652. The error amplifier and control circuit 654 compares the first or the second feedback signal with a predetermined reference signal and generates an error signal indicative of the difference, such as the voltage between the feedback signal received by the error amplifier and control circuit 654. The PWM circuit 656 generates a driving signal to modulate the DC signal in response to the error signal. For the signal transmission between circuits of different potentials and impedances, the isolation device 652 isolates the driving signal from the feedback circuit 250 and transmits the isolated driving signal to the AC to DC converter circuit 210. The isolation device 652 can be a photo-coupler in this embodiment.

Figure 7A:
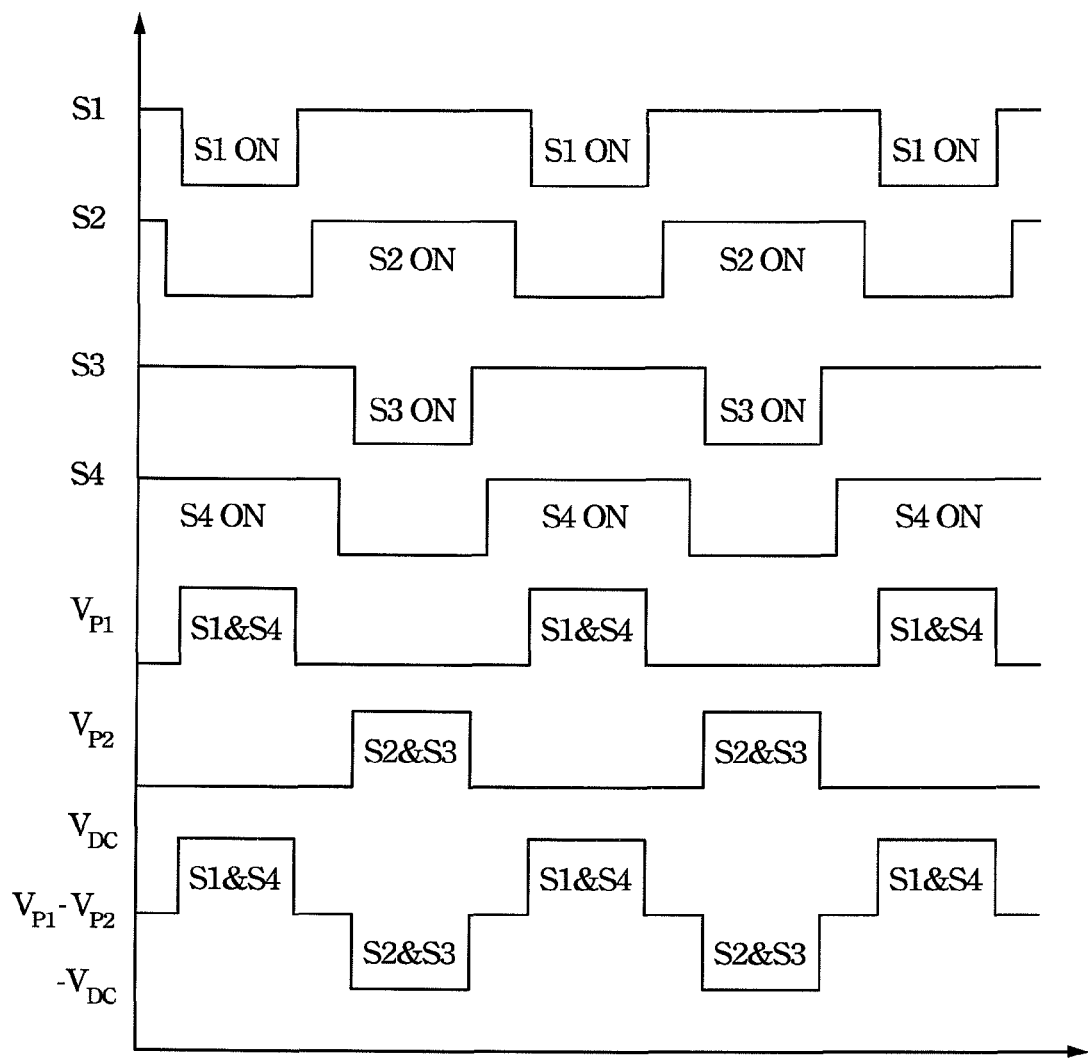
FIG. 7A and FIG. 7B are exemplary waveform diagrams with variably DC signal.
Figure 7B:
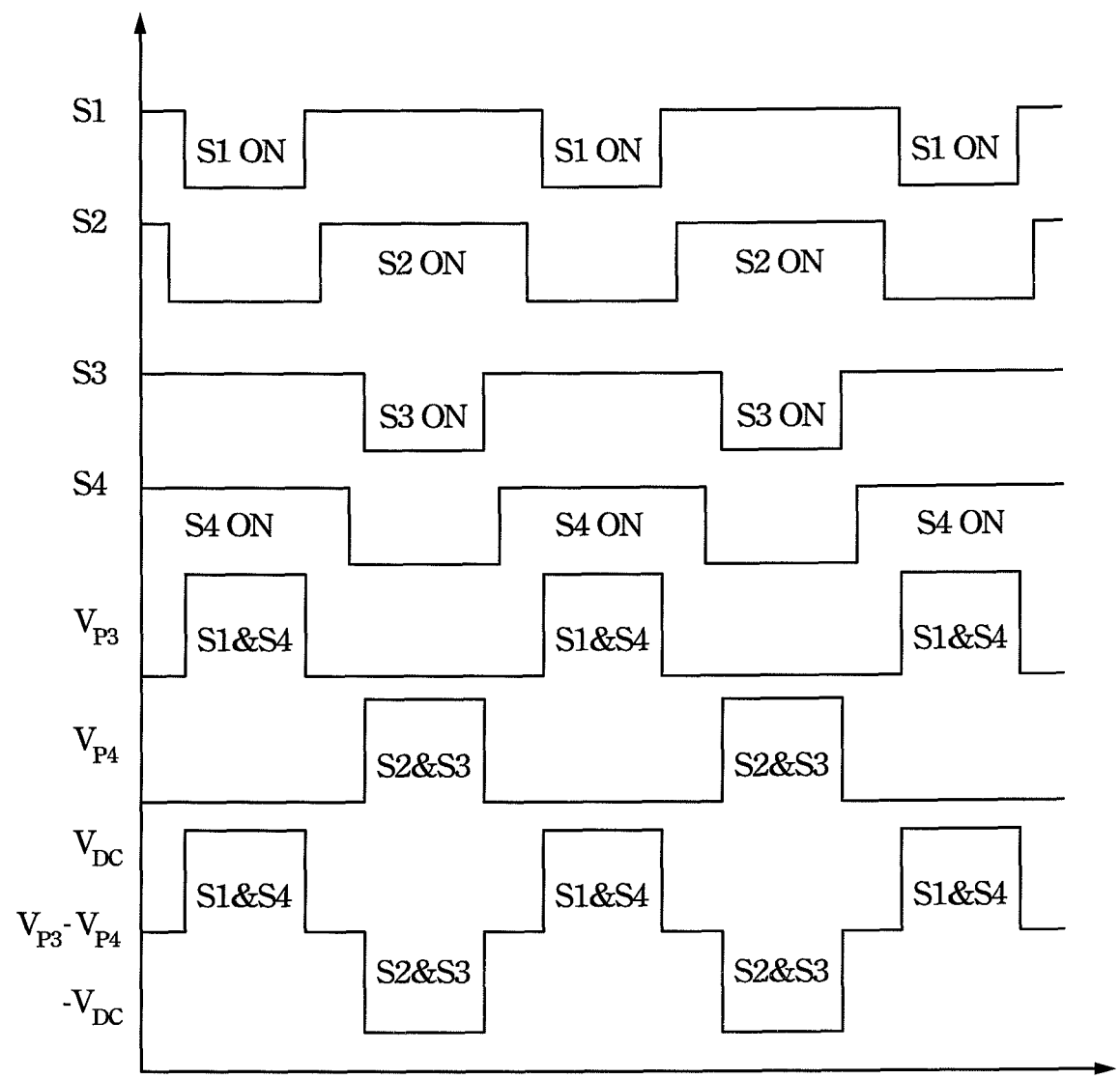

To deepen the impression of the object of the embodiments described above, please refer to FIG. 7A and FIG. 7B. FIG. 7A and FIG. 7B are exemplary waveform diagrams with variable DC signals. The first pair and the second pair of switches of the full bridge circuit are controlled by pulse signals with fixed duty cycles, respectively. Hence, the switches S1, S2, S3, and S4 work in the fixed periods. When one pair of switches such as S1 and S4 are turned on such that their on times over lap, power is delivered to the CCFL (via the transformer), along the conduction path defined by the pair of switches S1 and S4. Likewise, when the other pair of switches S2 and S3 are turned on such that their on times overlap, power is delivered to the CCFL (via the transformer), along the conduction path defined by other pair of switches S2 and S3.

The LCD power supply system in these four embodiments controls the power delivered to the CCFL by the voltage of the DC signal (Vp1, Vp2, Vp3, and Vp4 in these two figures). Vp3 and Vp4 in FIG. 7B are higher than Vp1 and Vp2 in FIG. 7A. In addition, the area of the pulse indicative of the power delivered to the CCFL load. The power in FIG. 7B is bigger than in FIG. 7A because the voltage level in FIG. 7B is larger than FIG. 7A and the pulse area in FIG. 7B is larger than FIG. 7A. Hence, the DC signal is generated in response to the amount of power delivered to the CCFL load. The modulation of the voltage level of the DC signal controls the power delivered to the CCFL load. Moreover, the present invention provides a new power supply system to drive the CCFL load as an alternative option for the wide application of the LCD.

It will be apparent to those skilled in the art that various modifications and variations can be made to the structure of the present invention without departing from the scope or spirit of the invention. In view of the foregoing, it is intended that the present invention covers modifications and variations thereof provided they fall within the scope of the appended claims.

What is claimed is:

1. An LCD (liquid crystal display) power supply comprising:
   an AC to DC converter circuit for coupling an AC power source to generate a DC signal;
   a transformer;
   a DC to AC converter circuit for coupling the DC signal to a primary side of the transformer and for alternating polarities thereof so that an AC signal is generated on a secondary side of the transformer to supply for a load;
   a feedback circuit for receiving a first feedback signal generated based on the AC signal, the feedback circuit configured for modulating the DC signal generated by the AC to DC converter circuit according to the first feedback signal to form a modulated DC signal, wherein the DC to AC circuit couples the modulated DC signal to the transformer with a fixed duty cycle.

2. The LCD power supply as claimed in claim 1, wherein the voltage level of the DC signal is modulated by the feedback circuit.

3. The LCD power supply as claimed in claim 1, wherein the AC signal is generated in response to a pulse signal of a fixed duty cycle.

4. The LCD power supply as claimed in claim 1, wherein the feedback circuit comprises:
   an isolation device for receiving the first feedback signal and for generating an isolation feedback signal;
   an error amplifier and control circuit for comparing the isolation feedback signal with a predetermined reference signal and for generating an error signal indicative of the difference between the isolation feedback signal and the predetermined reference signal; and
   a PWM circuit for controlling the AC to DC converter circuit to modulate the DC signal in response to the error signal.

5. The LCD power supply as claimed in claim 1, wherein the feedback circuit comprises:
   an error amplifier and control circuit for comparing the first feedback signal with a predetermined reference signal and for generating an error signal indicative of the difference between the first feedback signal and the predetermined reference signal;
   a PWM circuit for generating a driving signal to modulate the DC signal in response to the error signal; and
   an isolation device for isolating the driving signal from the feedback circuit and transmitting the isolated driving signal to the AC to DC converter circuit.

6. The LCD power supply as claimed in claim 1, wherein the feedback circuit is configured to receive a second feedback signal indicative of the voltage level of the DC signal for the modulation of the DC signal.

7. The LCD power supply as claimed in claim 6, further comprising:
a first switch for determining whether or not the first feedback signal is to be transmitted; and
a second switch for determining whether or not the second feedback signal is to be transmitted.

8. The LCD power supply as claimed in claim 7, wherein the first switch and the second switch are alternately switched.

9. The LCD power supply as claimed in claim 8, wherein the feedback circuit comprises:
an isolation device for receiving the first or second feedback signal and generating an isolation feedback signal;
an error amplifier and control circuit for comparing the isolation feedback signal to a predetermined reference signal and for generating an error signal indicative of the difference between the feedback signal and the predetermined reference signal; and
a PWM circuit for controlling the AC to DC converter circuit to modulate the DC signal in response to the error signal.

10. The LCD power supply as claimed in claim 8, wherein the feedback circuit comprises:
an error amplifier and control circuit for comparing the first or second feedback signal with a predetermined reference signal and for generating an error signal indicative of the difference between the feedback signal received by the error amplifier and control circuit and the predetermined reference signal;
a PWM circuit for generating a driving signal to modulate the DC signal in response to the error signal; and
an isolation device for isolating the driving signal from the feedback circuit and transmitting the isolated driving signal to the AC to DC converter circuit.

11. The LCD power supply as claimed in claim 1, wherein the feedback circuit comprises:
a voltage sensor and a current feedback sensor configured to obtain a voltage and current feedback signal from the load.

12. An LCD (liquid crystal display) power supply comprising:
an AC to DC converter circuit for coupling an AC power source to generate a DC signal;
a full bridge circuit comprising a first pair of switches arranged at opposite corners of the full bridge circuit, and a second pair of switches arranged at other opposite corners of the full bridge circuit, the first and second pair of switches being selectively coupled to the AC to DC converter circuit such that the first pair of switches defines a first conduction path and the second pair of switches defines a second conduction path, wherein the first and second pairs of switches are configured to switch at a constant frequency;
a transformer comprising a primary side and a secondary side, the primary side selectively coupled to the AC to DC converter circuit in an alternating fashion with a fixed duty cycle through the first and second conduction paths such that an AC signal is generated on the secondary side to supply for a load; and
a feedback circuit for receiving a first feedback signal generated based on the AC signal, the feedback circuit configured for modulating the DC signal generated by the AC to DC converter circuit according to the first feedback signal to form a modulated DC signal, wherein the DC to AC converter circuit is configured to couple the modulated DC signal to the transformer with a fixed duty cycle.

13. The LCD power supply as claimed in claim 12, further comprising:
a pulse generator for generating pulse signals for controlling the switches of the first and second pairs, respectively.

14. The LCD power supply as claimed in claim 12, wherein the voltage level of the DC signal is modulated by the feedback circuit.

15. The LCD power supply as claimed in claim 12, wherein the feedback circuit comprises:
an isolation device for receiving the first feedback signal and generating an isolation feedback signal;
an error amplifier and control circuit for comparing the isolation feedback signal with a predetermined reference signal and for generating an error signal indicative of the difference between the isolation feedback signal and the predetermined reference signal; and
a PWM circuit for controlling the AC to DC converter circuit to modulate the DC signal in response to the error signal.

16. The LCD power supply as claimed in claim 12, wherein the feedback circuit comprises:
an error amplifier and control circuit for comparing the first feedback signal with a predetermined reference signal and for generating an error signal indicative of the difference between the first feedback signal and the predetermined reference signal;
a PWM circuit for generating a driving signal to modulate the DC signal in response to the error signal; and
an isolation device for isolating the driving signal from the feedback circuit and for transmitting the isolated driving signal to the AC to DC converter circuit.

17. The LCD power supply as claimed in claim 12, wherein the feedback circuit is configured to receive a second feedback signal indicative of the voltage level of the DC signal for the modulation of the DC signal.

18. The LCD power supply as claimed in claim 17, further comprising:
a first switch for determining whether or not the first feedback signal is to be transmitted; and
a second switch for determining whether or not the second feedback signal is to be transmitted.

19. The LCD power supply as claimed in claim 18, wherein the first switch and the second switch are alternately switched.

20. The LCD power supply as claimed in claim 19, wherein the feedback circuit comprises:
an isolation device for receiving the first or second feedback signal and for generating an isolation feedback signal;
an error amplifier and control circuit for comparing the isolation feedback signal to a predetermined reference signal and for generating an error signal indicative of the difference between the feedback signal and the predetermined reference signal; and
a PWM circuit for controlling the AC to DC converter circuit to modulate the DC signal in response to the error signal.

21. The LCD power supply as claimed in claim 19, wherein the feedback circuit comprises:
an error amplifier and control circuit for comparing the first or second feedback signal with a predetermined reference signal and for generating an error signal indicative of the difference between the feedback signal received by the error amplifier and control circuit and the predetermined reference signal;

a PWM circuit for generating a driving signal to modulate the DC signal in response to the error signal; and an isolation device for isolating the driving signal from the feedback circuit and for transmitting the isolated driving signal to the AC to DC converter circuit.

22. The LCD power supply as claimed in claim 12, wherein the feedback circuit comprises:

a voltage sensor and a current feedback sensor configured to obtain a voltage and current feedback signal from the load.

23. An LCD (liquid crystal display) power supply comprising:

an AC to DC converter circuit for coupling an AC power source to generate a DC signal;

a transformer;

a DC to AC converter circuit for coupling the DC signal to a primary side of the transformer and for alternating polarities thereof so that an AC signal is generated on a secondary side of the transformer to supply for a load; and a feedback circuit for receiving a feedback signal generated based on the AC signal, the feedback circuit configured for modulating the DC signal generated by the AC to DC converter circuit according to the feedback signal, wherein the DC to AC converter circuit is configured to couple the modulated DC signal to the transformer with a fixed duty cycle;

wherein the DC signal is generated in response to amount of power delivered to the load.

24. The LCD power supply as claimed in claim 23, wherein the DC to AC converter comprises a plurality of switches arranged in a full bridge configuration and each switch of the DC to AC converter is controlled by a separate pulse signal of a fixed duty cycle.

25. The LCD power supply as claimed in claim 23, wherein the feedback circuit comprises:

an isolation device for receiving the first feedback signal and for generating an isolation feedback signal;

an error amplifier and control circuit for comparing the isolation feedback signal with a predetermined reference signal and for generating an error signal indicative of the difference between the isolation feedback signal and the predetermined reference signal; and a PWM circuit for controlling the AC to DC converter circuit to modulate the DC signal in response to the error signal.

26. The LCD power supply as claimed in claim 23, wherein the feedback circuit comprises:

an error amplifier and control circuit for comparing the first feedback signal with a predetermined reference signal and for generating an error signal indicative of the difference between the first feedback signal and the predetermined reference signal;

a PWM circuit for generating a driving signal to modulate the DC signal in response to the error signal; and an isolation device for isolating the driving signal from the feedback circuit and for transmitting the isolated driving signal to the AC to DC converter circuit.

27. The LCD power supply as claimed in claim 23, wherein the feedback circuit is further configured to receive a second feedback signal indicative of the voltage level of the DC signal for the modulation of the DC signal.

28. The LCD power supply as claimed in claim 27, further comprising:

a first switch for determining whether or not the first feedback signal is to be transmitted; and a second switch for determining whether or not the second feedback signal is to be transmitted.

29. The LCD power supply as claimed in claim 28, wherein the first switch and the second switch are alternately switched.

30. The LCD power supply as claimed in claim 29, wherein the feedback circuit comprises:

an isolation device for receiving the first or second feedback signal and for generating an isolation feedback signal;

an error amplifier and control circuit for comparing the isolation feedback signal to a predetermined reference signal and for generating an error signal indicative of the difference between the feedback signal and the predetermined reference signal; and a PWM circuit for controlling the AC to DC converter circuit to modulate the DC signal in response to the error signal.

31. The LCD power supply as claimed in claim 29 wherein the feedback circuit comprises:

an error amplifier and control circuit for comparing the first or second feedback signal with a predetermined reference signal and for generating an error signal indicative of the difference between the feedback signal received by the error amplifier and control circuit and the predetermined reference signal;

a PWM circuit for generating a driving signal to modulate the DC signal in response to the error signal; and an isolation device for isolating the driving signal from the feedback circuit and for transmitting the isolated driving signal to the AC to DC converter circuit.

32. The LCD power supply as claimed in claim 23, wherein the feedback circuit comprises:

a voltage sensor and a current feedback sensor configured to obtain a voltage and current feedback signal from the load.

* * * * *